(12) United States Patent
Szejwian

(10) Patent No.: US 10,005,314 B2
(45) Date of Patent: Jun. 26, 2018

(54) METHOD OF PRODUCING THREE-DIMENSIONAL STRUCTURAL SURFACES

(71) Applicant: SCHATTDECOR SP. Z.O.O., Tarnowo Podgorne (PL)

(72) Inventor: Jerzy Szejwian, Tarnowo Podgorne (PL)

(73) Assignee: SCHATTDECOR SP. Z.O.O., Tarnowo Podgóme (PL)

( * ) Notice: Subject to any disclaimer, the term of this patent is extended or adjusted under 35 U.S.C. 154(b) by 0 days. days.

(21) Appl. No.: 15/514,835

(22) PCT Filed: Sep. 25, 2015

(86) PCT No.: PCT/PL2015/000152
§ 371 (c)(1),
(2) Date: Mar. 28, 2017

(87) PCT Pub. No.: WO2016/060574
PCT Pub. Date: Apr. 21, 2016

(65) Prior Publication Data
US 2017/0217248 A1   Aug. 3, 2017

(30) Foreign Application Priority Data

Oct. 16, 2014   (PL) .......................... 409811

(51) Int. Cl.
| | |
|---|---|
| B60R 22/48 | (2006.01) |
| B44C 5/04 | (2006.01) |
| B41F 3/36 | (2006.01) |
| B41F 9/06 | (2006.01) |
| B41F 9/00 | (2006.01) |
| B41F 19/00 | (2006.01) |
| B41M 1/10 | (2006.01) |
| B41M 3/00 | (2006.01) |
| B41M 7/00 | (2006.01) |
| B44C 1/18 | (2006.01) |
| B32B 37/06 | (2006.01) |
| B32B 38/00 | (2006.01) |
| B32B 38/08 | (2006.01) |

(52) U.S. Cl.
CPC ............ *B44C 5/0492* (2013.01); *B32B 37/06* (2013.01); *B32B 38/08* (2013.01); *B32B 38/145* (2013.01); *B41F 3/36* (2013.01); *B41F 9/003* (2013.01); *B41F 9/066* (2013.01); *B41F 19/001* (2013.01); *B41M 1/10* (2013.01); *B41M 3/006* (2013.01); *B41M 7/009* (2013.01); *B41M 7/0054* (2013.01); *B44C 1/18* (2013.01); *B32B 2038/0076* (2013.01); *B32B 2305/54* (2013.01); *B32B 2317/12* (2013.01); *B32B 2317/16* (2013.01)

(58) Field of Classification Search
CPC . B44C 5/0492; B44C 1/18; B41F 3/36; B41F 9/066; B41F 9/003; B41F 19/001; B41M 1/10; B41M 7/0054; B41M 7/009; B32B 37/06; B32B 38/145; B32B 38/08; B32B 2038/0076; B32B 2305/54; B32B 2317/12; B32B 2317/16
See application file for complete search history.

(56) References Cited

U.S. PATENT DOCUMENTS

| | | | | |
|---|---|---|---|---|
| 4,500,373 | A  * | 2/1985 | Kubota ................... | B44C 1/205 156/154 |
| 2008/0070015 | A1* | 3/2008 | Fischer ..................... | B44F 9/00 428/211.1 |

* cited by examiner

*Primary Examiner* — Vishal I Patel
(74) *Attorney, Agent, or Firm* — PatShegen IP

(57) ABSTRACT

The invention relates to a method of producing three-dimensional structural surfaces based on synthetic resin-impregnated materials applied to the surface, in particular of wood-based panels. The method is characterized in that before the impregnation, at the stage of pattern printing, a mixture is applied to the decor paper, consisting of printing ink, whether with pigment or not, and a swelling agent in the form of microspheres, being encapsulated gas bubbles of sizes ranging from 2 pm to 180 pm, increasing its volume under the influence of rising temperature, wherein the mixture of the ink and the swelling agent contains from 0.3% to 45% by weight of the swelling agent, and after exiting the printing press and after the impregnation, the decor paper with the formed final pattern with a coded three-dimensional structure is pressed onto the surface, in particular of a wood-based panel, using a heated press plate with any working surface.

1 Claim, No Drawings

METHOD OF PRODUCING THREE-DIMENSIONAL STRUCTURAL SURFACES

The present invention relates to a method of producing three-dimensional structural surfaces based on synthetic resin-impregnated materials applied to the surface, in particular of wood-based panels.

Decor papers used for surface coating of wood-based panels, e.g. chipboards, hardboards, HDF, MDF boards or phenolic sandwich panels, etc., used in the manufacture of furniture, doors, floor or wall panels and other such products, generally consist of cellulose fibres and fillers. At the same time, they have an appropriate weight, smoothness, absorbency and strength. Decor paper is printed in special machines. One of such machines is a multicolour rotogravure printing press. Such press comprises an unwinder unwinding a roll of decor paper intended for printing. The speed and tension is given to the unwound paper web by an in-feed unit, feeding the paper to at least one printing unit, the main element of which is a rotogravure printing plate, e.g. a rotogravure printing cylinder. The paper travel speed and cylinder rotation speed are synchronised for optimum application of printing ink to the paper. The ink is transferred from the cylinder to the paper in the area of contact between the paper and a flexible impression roller, the so-called presser, pressing down paper to the cylinder. The ink of a selected colour is pumped from a tank to an ink tray located under the cylinder. In the ink tray there is a flexible inking roller that is in constant contact with the cylinder, thereby applying the printing ink to its rotating surface. Any excess of the printing ink is collected from the printing cylinder surface with a doctor blade. After the blade passes, the printing ink is only left inside engraved cells forming the main element of the printing cylinder and having a form of ink micro-cells of varying sizes, the openings of which are in line of the contact area between the cylinder surface and the paper. The ink cells form a screen surface with a specific pattern. Using the adhesion force, the ink is transferred from the ink cells to the paper. As a result, the pattern previously prepared on the cylinder surface is transferred to the decor paper. The paper with the pattern printed in the printing unit is subject to drying in a dryer unit of the printing unit, i.e. in the space with hot air blowing on the surface. A proper drying effect is ensured thanks to appropriately selected air temperature and its amount in the drying chamber, matched to the paper web travel speed. Depending on the pattern complexity, both in terms of colours and structure, subsequent printing units of the printing press are used. In a press with a number of printing units the web is directed from the drying chamber of the first unit to the next unit where it is subject to the analogous printing and drying process and then directed in a similar way to the subsequent printing units. After the final printing, the paper web is drawn from the printing press by an outfeed station and finally it is wound into a roll on a rewinder. Individual elements of the machine ensure both appropriate web tension of the travelling paper within the whole plant and fitting of patterns printed in individual printing units, forming the pattern of the final printed paper.

After the printing is complete, the decor paper wound into a roll is ready for impregnation. Impregnation is a process of saturating the decor paper with resin, conducted on impregnation lines. At the unwinder station of the impregnation line a paper web is unwound from a roll and directed to a bath with an impregnating agent. The most commonly used impregnating agents include aminoplast and duroplast synthetic resins, and in particular melamine and/or urea resins. A paper web is fully immersed in liquid resin or resin is applied to the paper using dosing stations. After the resin is applied to the paper, the whole web is temperature-dried, most commonly using hot air blowers. The impregnation process may take place once or twice. After the impregnation process completion, the dried and impregnated web of paper is cut into sheets or wound into rolls. The process results in impregnated decor paper, referred to as an impregnate. In the prior art, two types of structural three-dimensional surfaces have been known, namely synchronous and asynchronous.

A synchronous surface is a surface in which the three-dimensional structure on the final panel surface precisely reflects individual elements of the pattern printed on the decor paper. An asynchronous surface is a surface in which the three-dimensional structure on the final panel surface forms a pattern different from the one printed on the decor paper. In the both cases three-dimensional structures are created in a layer of synthetic resins used for impregnating decor papers and they are a precise reflection of the working surface of the press plate. In the case of three-dimensional synchronous structures a press plate is prepared based on the data obtained from a manufacturer of printing cylinders, used for the pattern application to the decor paper. Such data include, for example, the pattern data in a digital format or a printed sheet of paper with a specific pattern. The same data are used by manufacturers of both the press plate and the printing cylinders.

If we intend to make a three-dimensional synchronous surface on a panel, the printed and impregnated decor paper is cut in such a way as to match the pattern printed on it to the working surface pattern of the press plate. The cut sheet is positioned in the press. The positioning requires using complicated and expensive equipment, exactly positioning the impregnated decor paper on the plate under the press plate, while synchronising the pattern printed on the paper with the press plate working surface pattern. After the sheet is matched to the press plate pattern, the impregnated sheet is pressed onto a wood-based panel at a suitable pressure, temperature and time selected so as to obtain the final surface with the given parameters. The resulting three-dimensional synchronous panel surface precisely reflects the press plate working surface.

In the case of making asynchronous structures the positioning of the impregnated sheet pattern in relation to the press plate does not matter. The known methods of producing various three-dimensional structural surfaces on wood-based panels consist then mainly in using in the pressing process an appropriate plate with a three-dimensional working surface structure, forming a press plate, wherein in the case of manufacturing a synchronous surface structure the press plate surface structure is a precise reflection of elements of the pattern printed on decor papers, whereas in the case of an asynchronous surface there is no such synchronization.

In the known methods used in practice, for producing a three-dimensional surface having a proper structure it is required to produce each time a costly press plate corresponding to the desired structure. Any change of the final surface structure involves a required and time-consuming replacement of a press plate (mould) in the press, resulting in a standstill of the press. In the case of a synchronous surface each pattern of the decor paper applied to a wood-based panel requires a separate press plate. A change of pattern entails high costs and workload. It is also costly and inconvenient to position the impregnate in relation to the press plate in the press since before pressing, the impregnated decor paper must be precisely arranged on a wood-based panel and all the elements must be accurately positioned and matched to the press plate in the press. Otherwise, it is impossible to obtain a synchronous surface.

The aim of the invention is to provide an improved method of producing a three-dimensional structural surface of wood-based panels, in which the final surface structure after the pressing process would not depend on the press plate surface only. In addition, the invention aims to provide a method that allows avoiding a time-consuming and prolonged preparation of press plates corresponding to individual patterns of the decor paper applied to the panel and any related costs, as well as avoiding the costs of investment in systems for precise positioning of panels with the impregnate in the press in relation to the press plate during production of three-dimensional synchronous surfaces.

A method of producing three-dimensional structural surfaces made on the basis of decor papers used as surface coatings, in particular of wood-based panels, wherein the pattern is applied to the decor paper by printing in a machine equipped with at least one painting ink tank and at least one printing cylinder, having a surface with a pattern formed by engraved cells, having a form of ink micro-cells of varying sizes, wherein the ink from the ink cells is transferred to the travelling paper web when it comes in contact with the printing cylinder, forming on the paper a pattern corresponding to the pattern formed by the ink cells on the printing cylinder surface, whereupon the decor paper with the finally printed pattern is subject to drying in a drying chamber of the printing press and after drying, it is impregnated with synthetic resins, in particular melamine and/or urea resins, and then after drying in a chamber of the impregnation line it is pressed in the press onto the panel surface using a press plate, characterized in that before the impregnation, at the stage of pattern printing, a mixture is applied to the decor paper, consisting of printing ink, whether with pigment or not, and a swelling agent in the form of microspheres, being encapsulated gas bubbles of sizes ranging from 2 µm to 180 µm, increasing its volume under the influence of rising temperature, wherein the mixture of the ink and the swelling agent contains from 0.3% to 45% by weight of the swelling agent, and after exiting the printing press and after the impregnation, the decor paper with the formed final pattern with a coded three-dimensional structure is pressed onto the surface, in particular of a wood-based panel, using a press plate with any working surface, wherein a maximum temperature in the pressing process is higher than the maximum temperature in the printing press and the impregnation line.

In the provided method, the final pattern formed in the printing press creates a coded three-dimensional structure. After the impregnation, the pressing takes place with the use a press plate having any working surface, wherein a process of expansion of the swelling agent begins in the press in the initial pressing stage, at the moment of resin plasticization before it is finally cured, and the temperature in the pressing process is higher than the drying temperatures in the chambers of both the printing press and the impregnation line, wherein the temperatures, including those of printing and impregnating, may not result in the final expansion of the microspheres; thereby, the final structural surface of the finished product is formed as a result of expansion of the swelling agent.

In the method provided according to the present invention, it is possible to produce a three-dimensional synchronous final surface with no need for using appropriately prepared structural press plates, with its structural elements precisely corresponding to the pattern printed on the decor paper, and with no need for using any system for positioning the impregnate synchronously in relation to the press plate in the press.

Using the same press plate in the press, various three-dimensional structures of the final surface of the finished product may be obtained, wherein the structure is defined already before the impregnation, at the stage of printing with a swelling agent.

The method according to the invention in the embodiment relates to producing a three-dimensional synchronous structural surface on a decor paper applied to the surface of a chipboard.

The decor paper is printed in a four-colour rotogravure printing press. The printing press prints on the decor paper with a weight of 70 g/m$^2$ and a width of 1.85 m at a speed of 250 m/min at drying temperatures in the four consecutive air chambers of 130° C.; 125° C.; 128° C.; 100° C., respectively. The printing takes place in four printing units, each of which is equipped with a printing cylinder, i.e. a rotary cylinder transferring the printing ink to the decor paper in the area of contact with a flexible impression roller, the so-called presser. Water-soluble printing inks of different shades of colour are used for printing.

During printing on the decor paper, at the fourth printing unit a pattern is printed with a mixture of the printing ink containing 15% of the swelling agent, using a special gravure cylinder with a pattern synchronous with individual elements of the main pattern of the printed decor. The gravure cylinder applies 3 g/m$^2$ of such mixture to the paper. Finally, after printing, the printed decor paper is wound into a roll. The prepared roll of the printed decor paper is ready for impregnation.

The impregnation process takes place on an impregnation line with a speed of the paper web travel of 45 m/min, where the paper is saturated with an impregnating agent, initially with urea resin, and is subject to drying with hot air up to a maximum temperature of 135° C. In the subsequent unit of the impregnation line melamine resin is applied and dried at a maximum temperature of 160° C. As a result, the initially condensed resins are dry enough to allow storing the impregnated paper in cut sheets with dimensions tailored to those of the chipboards to which they are applied. After having been applied to the chipboard, the impregnate is cured at a temperature of 200° C. and under a pressure of 30 kg/cm$^2$ in a short-cycle press where the pressing time is 18 seconds. For the pressing in the press a press plate is used with a smooth working surface with a gloss of 35% (at an incidence angle of 60°). Under such conditions, the synthetic resin in the initial pressing phase is softened before its final curing and flows through the paper shell to the chipboard layer, thereby coating its surface. At that time, the external side of the impregnated paper, being in contact with the smooth press plate surface, precisely reflects its smooth structure. At the same time, the swelling agent used during printing of the decor paper is temperature-activated in the press. When the synthetic resin is softened, after exceeding the activation temperature of 160° C., spherical-shaped spheres of the swelling agent rapidly increase in volume, causing a local change in homogeneity of the resin. It is followed by the final curing of the synthetic resin. The local change of the synthetic resin structure precisely corresponds to the pattern of the printing cylinder used for applying the mixture with the swelling agent at the fourth unit of the printing press. As a result, a three-dimensional synchronous structure is formed on the melamine chipboard surface, independent of the working surface of the press plate.

The invention claimed is:

1. A method of producing a three-dimensional structural coating made on basis of a decor paper for coating panels, the method comprising:
    printing a pattern on a décor paper with a printing machine equipped with at least one painting ink tank and at least one printing plate having a surface with an engraved pattern formed by engraved cells, having a form of ink micro-cells of varying sizes, such that the ink from the ink cells is transferred to the décor paper when it comes in contact with the printing cylinder, forming thereby the pattern on the décor paper, corresponding to the engraved pattern;
    drying the decor paper and the pattern printed thereon in a printer drying chamber;
    impregnating the décor paper with a layer of synthetic resin, in particular melamine and/or urea resins, such that the pattern printed on the décor paper is covered by the layer of synthetic resin;
    drying the décor paper with the layer in an impregnating line drying chamber;
    pressing the décor paper onto a panel by using a press plate with any working surface;
    wherein the step of printing of the pattern includes applying a mixture of printing ink, and a swelling agent in a form of microspheres, being encapsulated gas bubbles of sizes ranging from 2 μm to 180 μm, configured for increasing the volume of the microspheres under the influence of rising temperature;
    wherein the mixture contains between 0.3% and 45% by weight of the swelling agent; and
    wherein a maximum temperature in the step of pressing is higher than a maximum temperature in the step of printing and the step of impregnating, such that during the step of pressing, the synthetic resin is softened and once the temperature exceeds the activation temperature of the swelling agent, the volume of the microspheres increases causing thereby the formation of the three-dimensional structural coating made of synthetic resin corresponding to the pattern.

* * * * *